United States Patent
An et al.

(10) Patent No.: US 12,378,992 B2
(45) Date of Patent: Aug. 5, 2025

(54) BALL BEARING AND BALL BEARING ASSEMBLY

(71) Applicant: Aktiebolaget SKF, Gothenburg (SE)

(72) Inventors: Hongyuan An, Shanghai (CN); Yafen Chen, Shanghai (CN); He Zhu, Shanghai (CN); Xiaoyun Ni, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 51 days.

(21) Appl. No.: 18/457,446

(22) Filed: Aug. 29, 2023

(65) Prior Publication Data

US 2024/0077105 A1    Mar. 7, 2024

(30) Foreign Application Priority Data

Sep. 5, 2022    (CN) .......................... 202211095083.8

(51) Int. Cl.
| | |
|---|---|
| *F16C 19/06* | (2006.01) |
| *F16C 33/10* | (2006.01) |
| *F16C 33/32* | (2006.01) |
| *F16C 33/58* | (2006.01) |
| *F16C 35/077* | (2006.01) |

(52) U.S. Cl.
CPC .......... *F16C 19/06* (2013.01); *F16C 33/1095* (2013.01); *F16C 33/32* (2013.01); *F16C 33/585* (2013.01); *F16C 35/077* (2013.01); *F16C 2202/22* (2013.01); *F16C 2240/60* (2013.01); *F16C 2240/70* (2013.01)

(58) Field of Classification Search
CPC .... F16C 19/06; F16C 33/1095; F16C 33/303; F16C 33/32; F16C 33/585; F16C 35/077; F16C 2202/22; F16C 2240/60; F16C 2240/76
See application file for complete search history.

(56) References Cited

U.S. PATENT DOCUMENTS

| | | | |
|---|---|---|---|
| 6,481,898 B1 * | 11/2002 | Yakura | F16C 33/303 |
| | | | 384/450 |
| 6,719,458 B2 * | 4/2004 | Yatabe | F16C 33/58 |
| | | | 384/450 |
| 2019/0003529 A1 * | 1/2019 | Motoda | F16C 33/586 |
| 2021/0088079 A1 * | 3/2021 | Anthony | F16C 33/565 |
| 2023/0272820 A1 * | 8/2023 | Kawaguchi | F16C 35/077 |
| | | | 384/463 |

FOREIGN PATENT DOCUMENTS

| | | | | | |
|---|---|---|---|---|---|
| JP | 2001012475 A | * | 1/2001 | ............ | F16C 33/303 |
| JP | 2004270792 A | * | 9/2004 | ............ | F16C 19/166 |

OTHER PUBLICATIONS

JP2004270792_A_Description.*

* cited by examiner

*Primary Examiner* — Phillip A Johnson
(74) *Attorney, Agent, or Firm* — Stinson LLP

(57) ABSTRACT

A ball bearing includes an inner ring (1), an outer ring (2), and a ball (3). The inner ring (1) has an inner ring groove curvature radius Ri. The outer ring (2) has an outer ring groove curvature radius Re. The ball (3) has a ball diameter Dw. The ratio of the outer ring groove curvature radius Re to the ball diameter Dw satisfies: Re/Dw≥0.5275; and/or the ratio of inner ring groove curvature radius Ri to the ball diameter Dw satisfies: 0.5175≤Ri/Dw≤0.55. The ball bearing may be accommodated in a housing, thereby forming a ball bearing assembly.

20 Claims, 1 Drawing Sheet

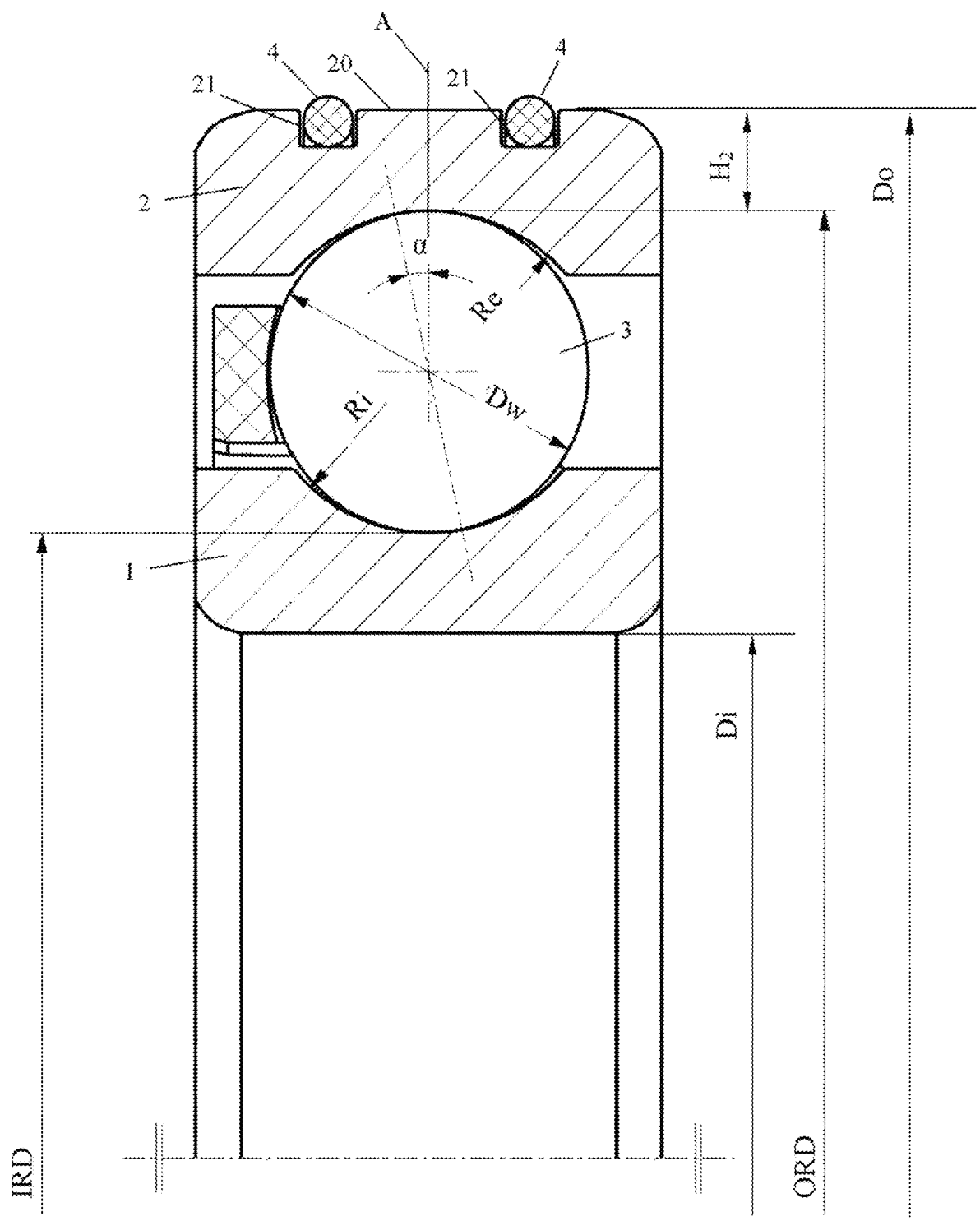

BALL BEARING AND BALL BEARING ASSEMBLY

CROSS-REFERENCE TO RELATED APPLICATION

This application claims priority to Chinese Application No. 202211095083.8, filed Sep. 5, 2022, the entirety of which is hereby incorporated by reference.

FIELD

The present disclosure provides a ball bearing and a ball bearing assembly including the ball bearing.

BACKGROUND

A ball bearing usually include an outer ring, an inner ring, balls and a cage for the balls. Sometimes, the outer ring of the ball bearing also needs to be set against the inner wall of the housing for accommodating the ball bearing. Currently, in some application scenarios, the outer ring of a ball bearing is in interference fit with the inner wall of the housing for accommodating the bearing directly or through other accessories (such as O-rings, etc.), or polymers or coatings are arranged on the outer ring to reduce the wear of the outer ring. In the prior art, the relative movement between the outer ring and the inner wall of the housing is limited or prevented by this means, so as to minimize the risks of the outer ring creeping.

However, for some applications, such as when the ball bearing is installed at the floating end of the motor, the mutual movement between the outer ring of the ball bearing and the inner wall of the housing is prevented, which also limits the axial floating ability of the bearing. Moreover, once the shaft undergoes thermal expansion due to various reasons, especially the axial thermal expansion of the shaft, it will drive the inner ring of the bearing abutting the shaft to move axially, and when the axial thermal expansion of shaft is more than half of the axial clearance of the ball bearing, the bearing will undergo an additional axial load caused by the thermal expansion of the shaft and/or the thermal expansion of the housing. Such additional axial load will increase the contact surface pressure between the balls and the grooves of the inner ring and the outer ring, which will lead to serious heating of the ball bearing, and even cause the ball to lock up, which will make the ball bearing unable to work and lead to premature damage.

In order to solve this problem in the prior art, the axial clearance of the bearing is only indirectly increased simply by directly increasing the radial clearance of the ball bearing. And the means to increase the radial clearance simply includes increasing the outer ring groove diameter (also called the outer ring groove bottom diameter, see ORD in FIG. 1) and/or decreasing the inner ring groove diameter (also called the inner ring groove bottom diameter, see IRD in FIG. 1). However, this method in the prior art will cause problems such as increasing of noise and vibration during bearing operation, so the effect of this method is not ideal.

SUMMARY

In view of this, the present disclosure provides a ball bearing comprising: an inner ring (1) having an inner ring groove curvature radius $R_i$; an outer ring (2) having an outer ring groove curvature radius $R_e$; a ball (3) having a ball diameter $D_w$; wherein the ratio of the outer ring groove curvature radius $R_e$ to the ball diameter $D_w$ satisfies: $R_e/D_w \geq 0.5275$; and/or the ratio of inner ring groove curvature radius $R_i$ to the ball diameter $D_w$ satisfies:

$$0.5175 \leq R_i/D_w \leq 0.55.$$

The present disclosure also provides a ball bearing assembly comprising the ball bearing as mentioned above; and a housing for accommodating the ball bearing.

According to the present disclosure, by comprehensively considering the dimension and interaction relationship between the inner and outer rings of the ball bearing and the balls, especially by optimizing the design of the groove curvature of the inner and outer rings and the balls, the axial clearance of the ball bearing is increased without changing the radial clearance of the ball bearing, so that the ball bearing according to the present disclosure is insensitive to the thermal expansion of the shaft or the housing, and is particularly suitable for application scenarios of direct or indirect interference fit between the outer ring of the ball bearing and the housing, or clearance fit through polymers or coatings.

BRIEF DESCRIPTION OF THE DRAWINGS

FIG. 1 is a schematic view of a ball bearing according to a preferred embodiment of the present disclosure.

DETAILED DESCRIPTION

In order to make the purpose, technical solution and advantages of the technical solution of the present disclosure clearer, the technical solution of the embodiment of the present disclosure will be described clearly and completely in the following with the attached drawings of specific embodiments of the present disclosure. Like reference numerals in the drawings represent like components. It should be noted that a described embodiment is a part of the embodiments of the present disclosure, not the whole embodiments. Based on the described embodiments of the present disclosure, all other embodiments obtained by those skilled in the field without creative labor fall into the scope of protection of the present disclosure.

Compared with the embodiments shown in the attached drawings, feasible embodiments within the protection scope of the present disclosure may have fewer components, other components not shown in the attached drawings, different components, components arranged differently or components connected differently, etc. Furthermore, two or more components in the drawings may be implemented in a single component, or a single component shown in the drawings may be implemented as a plurality of separate components.

Unless otherwise defined, technical terms or scientific terms used herein shall have their ordinary meanings as understood by those skilled in the field to which this disclosure belongs. For example, similar words such as "including" or "containing" mean that the elements or objects appearing before the word cover the elements or objects listed after the word and their equivalents, without excluding other elements or objects. "Up", "Down", "Left" and "Right" are only used to indicate the relative orientation relationship when the equipment is used or the orientation relationship shown in the attached drawings. When the absolute position of the described object changes, the relative orientation relationship may also change accordingly.

For the convenience of explanation, the direction of the rotation axis of the bearing is called the axial direction, and the direction perpendicular to the axial direction is called the radial direction. The term "inward/inward" refers to the direction toward the inside of the relevant component, whereas the term "outward/outward" refers to the direction toward the outside of the relevant component.

Referring to FIG. 1, the present disclosure provides a ball bearing, which mainly includes an inner ring 1, an outer ring 2, and a ball(s) 3, and the contact angle between the ball 3 and the outer ring is a. Further, the inner ring 1 has an inner ring groove curvature radius Ri, the outer ring 2 has an outer ring groove curvature radius Re, and the ball 3 has a ball diameter Dw. Of course, in order to ensure the normal operation of the ball bearing, it also includes a cage, seals and so on.

In order to solve the problems in the prior art, the present disclosure proposes that the ratio of the outer ring groove curvature radius Re to the ball diameter Dw satisfies: Re/DW≥0.5275; and/or the ratio of the inner ring groove curvature radius Ri to the ball diameter Dw satisfies: 0.5175≤Ri/Dw≤0.55.

The ball bearing according to the present disclosure is particularly suitable for the case where there is direct or indirect interference fit between the outer ring and the inner wall of the housing, or there is clearance fit through polymer or coating, as will be described in detail later. That is, the present disclosure has the advantages that under the condition that the outer ring has creep resistance due to interference fit or clearance fit between the outer ring and the housing (to prevent the outer ring from moving relative to the housing as much as possible), the possibility of bearing seizure caused by exhaustion of axial clearance after thermal expansion is reduced through the design of the dimensional relationship between the inner ring groove curvature radius and the outer ring groove curvature radius and the ball diameter.

Specifically, the axial clearance Ga of the ball bearing is expressed as below:

$$Ga=2(Re+Ri-Dw)*SQRT(1-(1-0.5Gr/(Re+Ri-Dw))^2)$$

Re is the r outer ring groove curvature radius; Ri is the inner ring groove curvature radius; Dw is the ball diameter; Gr is the radial clearance of the bearing, which is directly related to the outer ring groove diameter ORD and the inner ring groove diameter IRD, and the radial clearance Gr=ORD−DW×2−IRD.

In the prior art, in order to increase the axial clearance Ga, the radial clearance Gr of the ball bearing is simply increased directly, that is, the outer ring groove diameter ORD is increased and/or the inner ring groove diameter IRD is decreased, so as to increase the radial clearance Gr in an indirect way, because this is the easiest adjustment method to be thought of and the simplest and most convenient to implement. At the same time, however, it also brings problems such as NVH (noise, vibration and sound roughness) to the ball bearing.

In comparison, the technical solution of the present disclosure can realize the optimization of the axial clearance Ga without increasing the radial clearance Gr of the ball bearing. By adopting the ball bearing of the present disclosure, when the shaft to which the ball bearing is applied or the housing (not shown) for accommodating the ball bearing is thermally expanded, the ball bearing still has enough margin for axial movement, so that the ball will not bear excessive axial load, and at the same time, the sensitivity of the whole ball bearing to thermal expansion is reduced, and the risk of NVH problem of the ball bearing is minimized. Moreover, through this arrangement, the circumferential traction torque on the outer ring generated by the ball will also be reduced, which will further reduce the risks of "slipping" and "running" of the outer ring relative to the inner wall of the housing. Therefore, the design of the ball bearing according to the present disclosure is also particularly suitable for various ball bearings that need to operate at high speed, especially for deep groove ball bearings.

Therefore, the present disclosure comprehensively considers the dimensional relationship between the groove curvature radii Re and Ri of the outer ring and the inner ring and the ball diameter Dw, and proposes the above technical solution to optimize the axial clearance Ga of the ball bearing. That is, the present disclosure provides a way to increase the axial clearance Ga of the ball bearing under the condition that the radial clearance Gr is unchanged, which specifically includes:

1) designing the outer ring groove curvature radius and the ball diameter to satisfy Re/Dw≥0.5275;
2) designing the inner ring groove curvature radius and the ball diameter to satisfy 0.5175≤RI/DW≤0.55;
3) at the same time, designing the inner and outer ring groove curvature radii and the ball diameter to satisfy Re/Dw≥0.5275 and 0.5175≤Ri/Dw≤0.55.

Wherein, Solution 1) or 2) is designed from a perspective of the relationship between the outer ring and the ball, or between the inner ring and the ball, respectively. In comparison, Solution 1 is more preferred, because the range for adjusting the outer ring groove curvature radius is larger and a relatively larger Ga increment can be obtained; while, if the inner ring groove curvature radius in Solution 2 is increased too much, the contact area between the inner ring and the ball may increase to a greater extent than that between the outer ring and the ball, which may directly affect the heating of the ball bearing. Among the three solutions, solution 3 is the best solution, which takes into account the advantages and disadvantages of solutions 1 and 2, and can obtain the following better technical effects:

1) the axial clearance of the ball bearing according to the present disclosure is improved by more than 31% compared with the axial clearance in the prior art products;
2) the traction torque of the ball acting on the outer ring along the circumferential direction is significantly reduced;
3) the heating of the inner and outer rings of the bearing is obviously reduced;
4) the temperature difference between the inner ring and the outer ring of the bearing is significantly reduced, and the axial clearance of the bearing under the working state is increased relatively, and the bearing is insensitive to the thermal expansion of the shaft and the housing.

According to a further preferred embodiment of the present disclosure, the above-mentioned ratio range can also have a better choice for design. For example, the ratio of the outer ring groove curvature radius Re to the ball diameter Dw may satisfy: 0.5275≤Re/Dw≤0.57. And more preferably, the ratio of the outer ring groove curvature radius Re to the ball diameter Dw may satisfy: 0.535≤Re/Dw≤0.56. In comparison, in the prior art ball bearings, the value of Re/Dw is usually less than 0.52.

In addition, the ratio of the inner ring groove curvature radius Ri to the ball diameter Dw may satisfy: 0.52≤Ri/Dw≤0.54. In comparison, in prior art ball bearings, the value of Ri/Dw is usually less than 0.52.

According to different preferred embodiments of the present disclosure, the present disclosure also proposes an improved design for the ball itself and the thickness of the outer ring.

Preferably, the thermal expansion coefficient of the ball 3 may be smaller than that of the inner ring 1 or the outer ring 2, to further reduce the thermal expansion sensitivity of the ball, so that even if thermal expansion occurs, the influence on the axial clearance will be small. For this reason, the ball may preferably contain a ceramic material, and more preferably, Si3N4 may be used to manufacture the ball.

Preferably, the material density of the ball 3 may be smaller than that of the inner ring 1 or the outer ring 2. Therefore, by reducing the material density of the ball 3, the ball 3 is relatively lighter, the centrifugal force of the ball is smaller when the ball bearing is running, and the force acting on the outer ring is also smaller, further reducing the risk of "running" of the outer ring.

Preferably, as shown in FIG. 1, the minimum thickness $H_2$ of the outer ring 2 is $\geq 0.25 H_1$, wherein $H_1$ is the radial dimension of the ball bearing in the sense of thickness, which is numerically equal to half of the difference between the outer diameter Do of the bearing and the inner diameter Di of the bearing. The minimum thickness $H_2$ is the smallest outer ring thickness along the radial direction in a plane A which passes through the center of the ball and perpendicular to the axial direction.

In addition, for the interference fit between the outer ring and the inner wall of the housing provided above, various ways may be used to directly or indirectly realize such interference fit, and the ball bearing of the present disclosure can well adapt to the application scenarios having these interference fits, so as to solve the problems of creep, running and the like of the bearing outer ring with its movement being limited.

For example, the diameter of the outer ring 2 may be set to be larger than the inner diameter of the inner wall of the housing (not shown) for accommodating the ball bearing, so as to be in interference fit with the housing. In this case, the outer ring 2 and the housing may generally include chamfers with non-interference dimensions so as to be aligned with each other during installation, and then the ball bearing is pressed into the housing by hard pressing to realize the interference fit between them.

For another example, that out ring 2 may include an accessory arrange on the outer peripheral surface thereof, and the maximum radial peripheral dimension of the accessory is larger than the inner diameter of the inner wall of the housing for accommodating the ball bearing, so that the outer ring is in interference fit with the housing through the accessory.

As specifically shown in the preferred embodiment of FIG. 1, the outer ring 2 may include at least one annular channel 21 (shown as an example in which two annular channels 21 are provided) on its outer peripheral surface, and an O-ring 4 as the accessory is provided in each annular channel. Therefore, the outer ring 2 is indirectly in interference fit with the inner wall of the housing through the O-ring 4. Further preferably, the outer ring 2 includes two annular channels 21, with one O-ring 4 arranged in each annular channel 21. In another preferred embodiment, the two annular channels 21 may be symmetrically arranged relative to the ball 3, so that the stress on the outer ring 2 is more uniform and the ball bearing runs more stably.

In another preferred embodiment not shown, a sleeve or collar as the accessory can may be formed on the outer peripheral surface of the outer ring by injection molding, and the outer diameter of the sleeve or collar is larger than the inner diameter of the inner wall of the housing, so that the outer ring is indirectly in interference fit with the inner wall of the housing through the sleeve or collar.

According to the above embodiment, indirect interference fit can be realized by setting the O-ring or the injection-molded sleeve or collar, which can help the outer ring to firmly engage with the inner wall of the housing, so as to prevent the circumferential rotation of the outer ring relative to the inner wall of the housing. Therefore, this design of the present disclosure is particularly suitable for the case where the ball bearing is used at the floating end of a motor.

In addition, the ball bearing of the present disclosure is especially suitable for the case where the outer peripheral surface of the outer ring includes a polymer or coating (for example, MoS2, etc.) with self-lubricating property to adapt the application with the interference clearance of the housing, and the polymer or coating is used to reduce the wear of the inner hole of the housing, thereby avoiding the problems, such as abnormal vibration or noise of the system, caused by excessive wear of the inner hole of the housing.

Furthermore, the present disclosure also provides a ball bearing assembly, which includes the ball bearing according to the present disclosure as described above and a housing (not shown) for accommodating the ball bearing. The inner wall of the housing can be directly or indirectly interference fit with the outer ring of the ball bearing, or clearance fit with the outer ring of the ball bearing through polymer or coating.

The exemplary implementation of the solution proposed in this disclosure has been described in detail above with reference to the preferable embodiments. However, it can be understood by those skilled in the art that without departing from the concept of this disclosure, various changes and modifications can be made to the above specific embodiments, and various technical features and structures proposed in this disclosure can be combined in various ways without exceeding the scope of protection of this disclosure, which is determined by the appended claims.

What is claimed is:

1. A ball bearing comprising:
   an inner ring having an inner ring groove with an inner ring groove curvature radius (Ri);
   an outer ring having an outer ring groove with an outer ring groove curvature radius (Re); and
   a ball having a ball diameter (Dw), the ball engaging a base of the inner ring groove and a base of the outer ring groove;
   wherein the ratio of the outer ring groove curvature radius to the ball diameter satisfies: Re/Dw≥0.5275; and/or the ratio of inner ring groove curvature radius to the ball diameter satisfies: 0.5175≤Ri/Dw≤0.55.

2. The ball bearing according to claim 1, wherein a thermal expansion coefficient of the ball is smaller than a thermal expansion coefficient of the inner ring or the outer ring; and/or a material density of the ball is smaller than a material density of the inner ring or the outer ring.

3. The ball bearing according to claim 2, wherein a minimum thickness of the outer ring is ≥0.25 $H_1$, the $H_1$ is half of the difference between the outer diameter of the bearing and the inner diameter of the bearing, and the minimum thickness is the minimum outer ring thickness along the radial direction in a plane which passes through the center of the ball and perpendicular to the axial direction.

4. The ball bearing according to claim 3, wherein the ratio of the outer ring groove curvature radius to the ball diameter satisfies:

$$0.5275 \leq Re/Dw \leq 0.57.$$

5. The ball bearing according to claim 4, wherein the ratio of the outer ring groove curvature radius to the ball diameter satisfies:

$$0.535 \leq Re/Dw \leq 0.56.$$

6. The ball bearing according to claim 5, wherein the ratio of the inner ring groove curvature radius to the ball diameter satisfies:

$$0.52 \leq Ri/Dw \leq 0.54.$$

7. The ball bearing according to claim 6, wherein the diameter of the outer ring is larger than the inner diameter of an inner wall of a housing for accommodating the ball bearing, so as to be in interference fit with the housing.

8. A ball bearing assembly comprising:
the ball bearing according to claim 7; and
the housing for accommodating the ball bearing.

9. The ball bearing according to claim 6, wherein an outer peripheral surface of the outer ring has a polymer or coating with self-lubricating property, so as to be in clearance fit with a housing, and the polymer or coating is for reducing wear of an inner hole of the housing.

10. The ball bearing according to claim 6, wherein the outer ring comprises an accessory arranged on an outer peripheral surface of the outer ring, and the maximum radial peripheral dimension of the accessory is larger than the inner diameter of an inner wall of a housing for accommodating the ball bearing, so that the outer ring is in interference fit with the housing through the accessory.

11. The ball bearing according to claim 1, wherein a minimum thickness of the outer ring is $\geq 0.25\, H_1$, the $H_1$ is half of the difference between the outer diameter of the bearing and the inner diameter of the bearing, and the minimum thickness is the minimum outer ring thickness along the radial direction in a plane which passes through the center of the ball and perpendicular to the axial direction.

12. The ball bearing according to claim 1, wherein the ratio of the outer ring groove curvature radius to the ball diameter satisfies:

$$0.5275 \leq Re/Dw \leq 0.57.$$

13. The ball bearing according to claim 12, wherein the ratio of the outer ring groove curvature radius to the ball diameter satisfies:

$$0.535 \leq Re/Dw \leq 0.56.$$

14. The ball bearing according to claim 1, wherein the ratio of the inner ring groove curvature radius to the ball diameter satisfies:

$$0.52 \leq Ri/Dw \leq 0.54.$$

15. The ball bearing according to claim 1, wherein the diameter of the outer ring is larger than the inner diameter of an inner wall of a housing for accommodating the ball bearing, so as to be in interference fit with the housing.

16. The ball bearing according to claim 1, wherein an outer peripheral surface of the outer ring has a polymer or coating with self-lubricating property, so as to be in clearance fit with a housing, and the polymer or coating is for reducing wear of an inner hole of the housing.

17. The ball bearing according to claim 1, wherein the outer ring comprises an accessory arranged on an outer peripheral surface of the outer ring, and the maximum radial peripheral dimension of the accessory is larger than the inner diameter of an inner wall of a housing for accommodating the ball bearing, so that the outer ring is in interference fit with the housing through the accessory.

18. A ball bearing assembly comprising:
the ball bearing according to claim 1; and
a housing for accommodating the ball bearing.

19. The ball bearing according to claim 1, wherein the ball has a single point of contact with the inner ring and a single point of contact with the outer ring.

20. The ball bearing according to claim 1, wherein the inner ring groove curvature radius (Ri) is uniform over a cross-section of the inner ring groove and the outer ring groove curvature radius (Re) is uniform over a cross-section of the outer ring groove.

* * * * *